United States Patent
Preul

(10) Patent No.: US 6,997,201 B2
(45) Date of Patent: Feb. 14, 2006

(54) WASTEWATER SOURCE CONTROL SYSTEM

(76) Inventor: Herbert C. Preul, 760 Old Ludlow Ave., Cincinnati, OH (US) 45220

( * ) Notice: Subject to any disclaimer, the term of this patent is extended or adjusted under 35 U.S.C. 154(b) by 171 days.

(21) Appl. No.: 10/678,009

(22) Filed: Oct. 2, 2003

(65) Prior Publication Data

US 2005/0072465 A1 Apr. 7, 2005

(51) Int. Cl.
*F16K 17/36* (2006.01)
*F16K 31/12* (2006.01)

(52) U.S. Cl. ............ 137/1; 137/78.1; 137/363; 137/393; 73/863.02

(58) Field of Classification Search ............ 137/78.1, 137/363, 393, 1, 12; 73/863.02
See application file for complete search history.

(56) References Cited

U.S. PATENT DOCUMENTS

| | | | | |
|---|---|---|---|---|
| 4,022,059 A | * | 5/1977 | Schontzler et al. ............ 73/198 |
| 4,221,127 A | * | 9/1980 | McClure ................. 73/861 |
| 4,987,913 A | * | 1/1991 | Kodate et al. ............ 137/1 |
| 5,506,791 A | * | 4/1996 | Hungerford et al. .......... 702/50 |
| 5,835,386 A | * | 11/1998 | Orr et al. ............... 703/2 |

OTHER PUBLICATIONS

Herbert C. Preul, *Analysis of Source Control for Domestic Wastewaters*, Wat. Sci. Tech. vol. 32, No. 1., pp. 156–159, 1995.

* cited by examiner

*Primary Examiner*—A. Michael Chambers
(74) *Attorney, Agent, or Firm*—Wood, Herron & Evans, L.L.P.

(57) ABSTRACT

A wastewater control system for use with a sewer service line conducting a flow of wastewater from a building to a sewer main. A flow control device is installed in the sewer service line; and an actuator, in electrical communication with the sensor, is connected to the flow control device. The actuator in response to an output signal from a hydrologic sensor causes the flow control device to block the flow of wastewater to the sewer main and detain the wastewater in the sewer service line.

33 Claims, 6 Drawing Sheets

WASTEWATER SOURCE CONTROL SYSTEM

FIELD OF THE INVENTION

This invention relates to sewage collection systems including both sanitary sewers and combined sewers.

BACKGROUND OF THE INVENTION

For purposes of clarification and understanding of this document, the following definitions are set forth. The term "wastewater" designates contaminated domestic wastewater such as "sanitary sewage" as well as water that carries away other waste matters from households, mercantile, commercial, and industrial establishments. "Stormwater" refers to rainfall runoff waters collected in sewers. "Extraneous inflows" refer to waters that enter a sewer collection system by infiltration from ground waters and by inflow from surface water sources especially during stormwater runoff periods. "Combined sewer systems" carry "combined sewage" that is a mixture of wastewater and stormwater plus a certain amount of extraneous inflows. In separate wastewater sewer systems, "wastewater mixtures" are the result of wastewater mixing with extraneous inflows.

Combined sewer systems are designed to transport combined sewage in the form of wastewater plus a much larger allowance in flow capacity for stormwater and a minor allowance for extraneous inflow. Combined sewage is commonly collected in municipal combined sewer systems; and during low flow periods, combined sewage is mainly comprised of wastewater which is directed via an interceptor pipeline to a wastewater treatment plant. However, when heavy stormwater flows occur, combined sewer flows often exceed the flow capacity of the interceptor; and the overflow is diverted into a receiving watercourse such as a natural stream or river. These overflows are referred to as combined sewer overflow ("CSO"). However, in high rainfall climates over an annual period, CSOs may be a frequent occurrence resulting in receiving water pollution.

Separate wastewater sewer systems are designed to transport wastewater plus a limited allowance for extraneous inflow. They do not have direct stormwater connections to surface water inlets as do combined sewers. Although separate wastewater sewer systems are intended to carry mainly domestic wastewater, during high rainfall runoff periods, they also may become overloaded due to extraneous inflows and therefore, carry a wastewater mixture, which is usually a more concentrated form of combined sewage. Overflows from separate wastewater or sanitary sewer systems are generally referred to as a "Sanitary Sewer Overflow" ("SSO"). SSOs generally contain a larger wastewater or sanitary sewage component and are of higher pollution concentrations than CSOs from combined sewers.

There is a continuing effort to reduce water pollution in watercourses, streams, rivers, lakes, oceans, and other receiving bodies of water from CSO, which is emphasized in the U.S. Environmental Protection Agency (EPA) guidance documents including "Combined Sewer Overflow (CSO) Control Policy (66 FR 42226) and "Coordinating CSO Long-term Planning with Water Quality Standards Reviews (EPA-833-R-01-002; July 2001)".

Therefore, there is a need during heavy stormwater runoff periods to prevent, or to some substantial degree avoid, the creation of combined or mixed sewage, thereby reducing CSO and SSO pollution concentrations.

SUMMARY OF THE INVENTION

The present invention is a sewage control system that prevents or reduces the pollution content of combined sewage or wastewater mixtures which often overflow from sewer systems into watercourses, streams, rivers, lakes, oceans, and other receiving bodies of water as a result of heavy rainfall runoff and infiltration.

According to the principles of the present invention and in accordance with the described embodiments, the invention provides a wastewater control system for use with a sewer service line conducting a flow of wastewater from a building to a sewer main. A flow control device is installed in the sewer service line; and an actuator is connected to the flow control device. The actuator, in response to an output signal from a hydrologic sensor, causes the flow control device to block the flow of wastewater to the sewer main and detain the flow of wastewater in the sewer service line.

In one aspect of the invention, the hydrologic sensor is either a flow sensor monitoring a flow in the sewer main or a rainfall sensor. In another embodiment of the invention, in response to the output signal, the wastewater in the sewer service line is detained in a detention tank. In a further embodiment of the invention, the wastewater in the detention tank is pumped therefrom with a sump pump.

By detaining building wastewater upstream from its point of discharge into a sewer main during certain heavy stormwater runoff periods, the creation of combined or mixed sewage is prevented or to some substantial degree avoided, thereby reducing CSO and SSO pollution concentrations.

In still further embodiment, the invention provides a system of several wastewater control systems in which each system has a plurality of flow control devices and a plurality of actuators. Each flow control device is installed in association with one of the sewer service lines, and each actuator is in electrical communication with a hydrologic sensor and connected to a respective one of the flow control devices. In response to the hydrologic sensor providing an output signal, each actuator causes a respective one of the flow control devices to block the flow of wastewater from a respective one of the sewer service lines into the sewer main and detain the flow of wastewater in the respective one of the sewer service lines. In one aspect of this embodiment, the operation of the wastewater control system is controlled by a computer.

These and other objects and advantages of the present invention will become more readily apparent during the following detailed description taken in conjunction with the drawings herein.

DETAILED DESCRIPTION OF THE INVENTION

Figure 1:
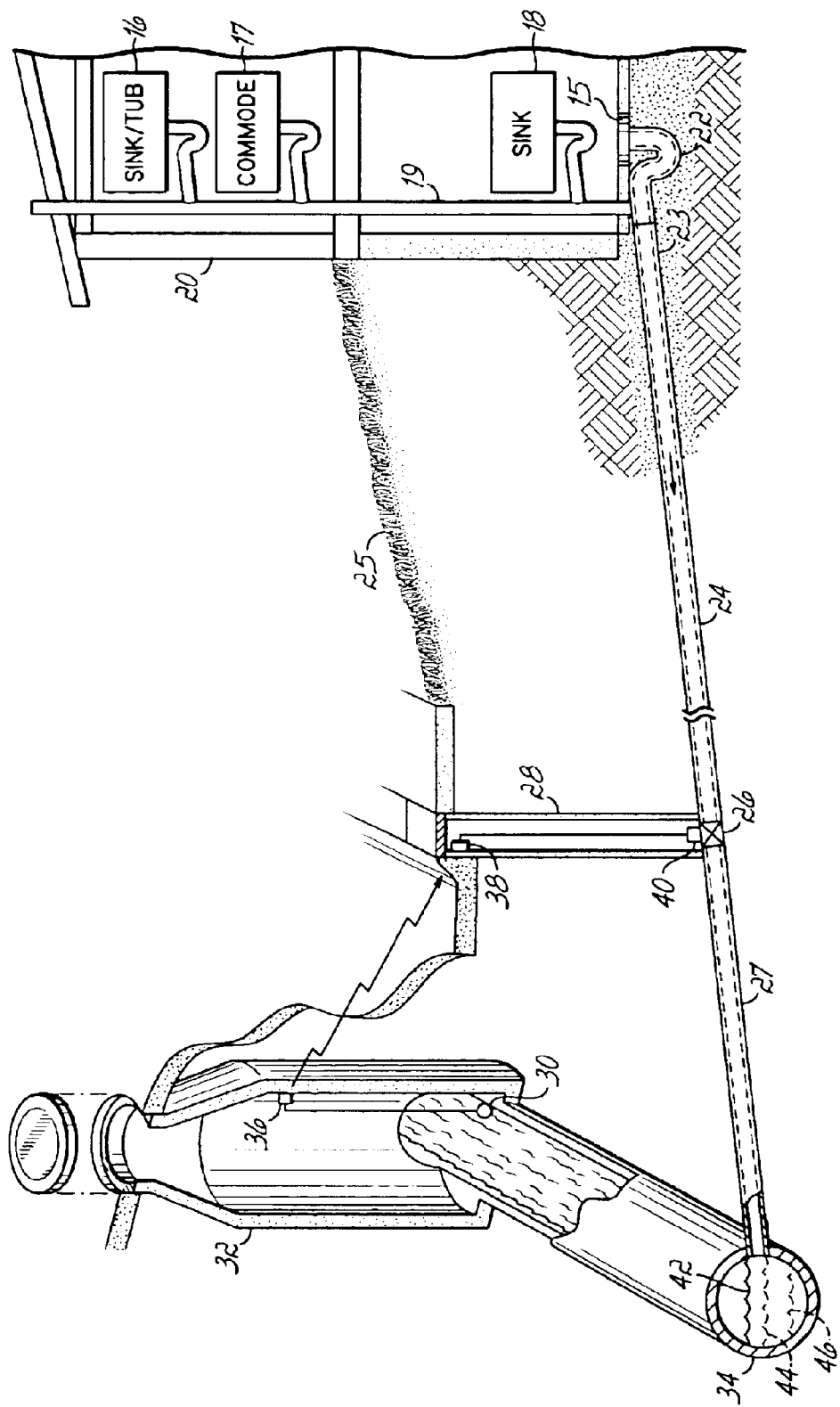
FIG. 1 is a schematic illustration of a wastewater control system in accordance with the principles of the present invention.

Referring to FIG. 1, in one embodiment, drains 15 as well as plumbing fixtures, for example, one or more commodes 16, tubs 17, sinks 18, etc., connected to one or more soil stacks 19 in a building 20 discharge wastewater through a building drain pipe 22. The building 20 can be used for residential, commercial, or industrial purposes. The building drain pipe 22 is connected to an intake or upstream end 23 of a building sewer service line 24, which is located below grade 25 and is often 6 inches (15 centimeters) or more in internal diameter for a single family dwelling. A discharge or downstream end 27 of the sewer service line 24 is connected to a sewer main 34. For purposes of this document, "downstream" refers to a location nearer to, or a direction extending toward, the sewer main 34, and "upstream" refers to a location nearer to, or a direction extending toward, the building 20. An automated flow control device 26 is connected in the sewer service line for controlling a flow of wastewater in the sewer service line 24. Most often the flow control device 26 is located near the downstream end 27 of the sewer service line 24. The automated flow control device 26 is located in a service box 28 to provide access for maintenance and may be a valve or any device that provides the intended service. The flow control device 26 is operated by an actuator 40 and may be powered by electricity from a battery or other source, air or other fluid pressure, water or other hydraulic pressure, or another source of energy. A hydrologic sensing device is used to detect a high flow in a sewer main 34 or an event, for example, rainfall, that would create a high flow in the sewer main 34. In FIG. 1, the hydrologic sensing device may be any device that indicates flow level, flow quantity or depth of flow in a receiving sewer main or a manhole, for example, a flow level sensor 30, that is located in a manhole 32 and detects a level of flow through a sewer main 34. The sensor 30 provides flow output signals to a signal transmitter 36, which transmits the flow output signals to a signal receiver 38. The transmitter 36 electrically communicates with the receiver 38 using wired or wireless technology. The receiver 38 provides the flow output signals to the actuator 40, which operates the flow control device 26 accordingly. The sensor 30, transmitter 36 and receiver 38 are powered by electricity from a battery or other source.

In use, during normal periods, the flow control device is open; and wastewater from the building 20 flows through the sewer service line 24, past the flow control device 26 and into the sewer main 34. Without the invention, when the flow through the sewer main 34 includes wastewater from the building 20 plus a heavy stormwater flow, a CSO is often produced in a receiving watercourse. However, with the invention, the flow level sensor 30 detects a greater than normal flow level 42 and provides a high flow signal, which is transmitted to the actuator 40 via the transmitter 36 and receiver 38. The high flow signal causes the actuator 40 to close the flow control device 26, thereby detaining or storing wastewater from the building 20 in the sewer service line 24.

Wastewater detention volume is approximately 1.5 gallons per ft. or 73 gallons (276 liters) per 50 ft. (15.2 meters) of 6-inch (15-centimeters) diameter building service line. Although building sewer service line lengths and domestic wastewater discharge volumes vary greatly, it is estimated that these volumes will bridge a high percentage of above normal sewer main flows and thus, substantially minimize or prevent CSOs and SSOS.

As the stormwater flow event lessens, the flow level sensor 30 detects a lesser flow level 44 in the sewer main 34 and provides a lesser flow signal to the actuator 40 via the transmitter 36 and receiver 38. The lesser flow signal causes the actuator 40 to open the flow control device 26, thereby restoring a flow of wastewater from the building 20, through the sewer service line 24 and into the sewer main 34.

It should be noted that the lesser flow 44 can be equal to or greater than a normal flow 46 of through the sewer main 34. Further, if, while the flow control device 26 is closed, should the sewer service line 24 become full as detected by a sensor 42, the actuator 40 causes the flow control device 26 to open, so that wastewater does not backup into the plumbing piping of the building 20. The sensor 42 can be any device that is effective to detect that wastewater has filled the sewer service line 24 upstream of the flow control device 26, for example, a float switch located in the sewer service line upstream of the flow control device 26. Alternatively, instead of using the sensor 42, the flow control actuator can be designed to open in response to wastewater substantially filling the sewer service line 24 upstream of the flow control device 26.

Figure 2:
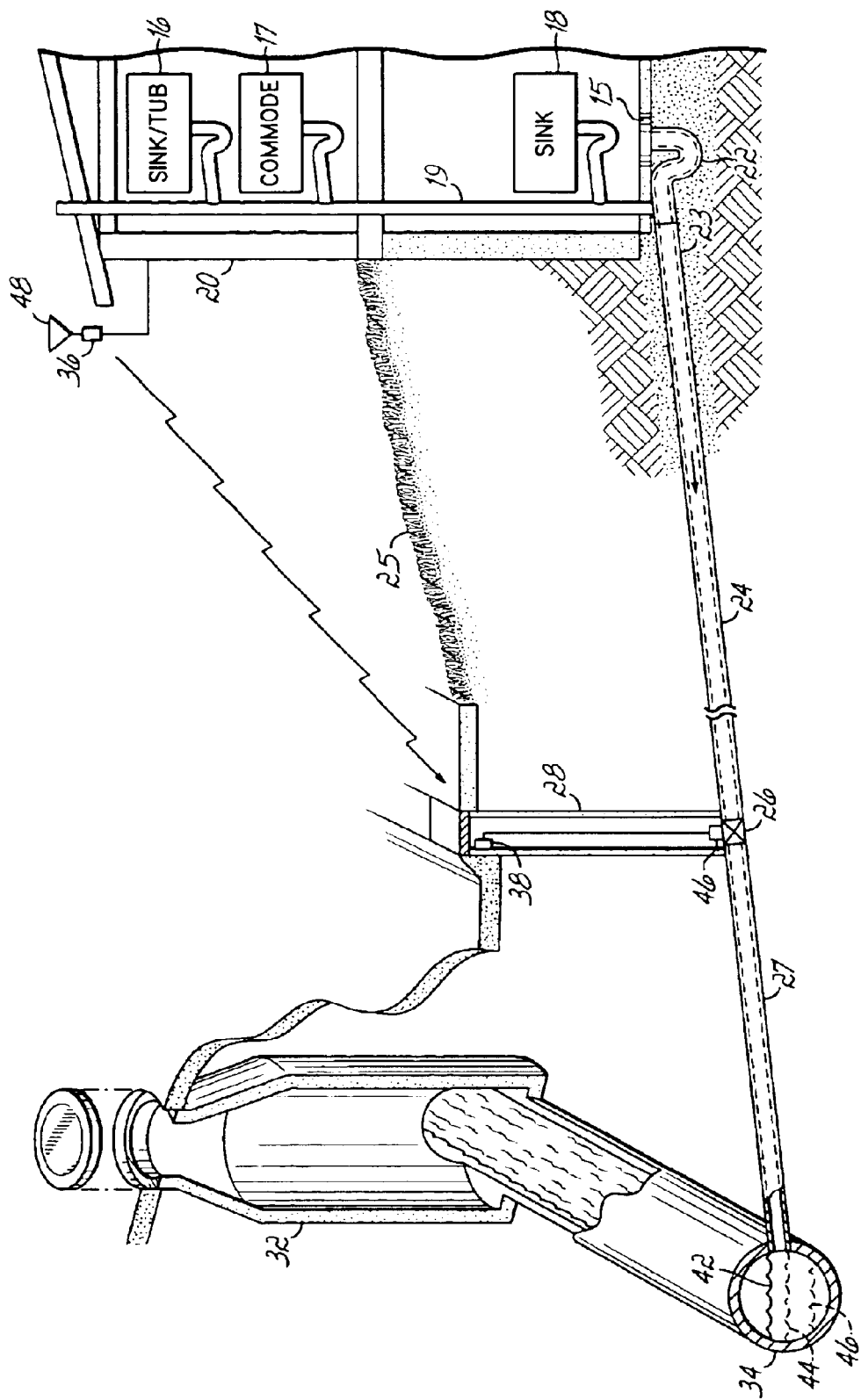
FIG. 2 is a schematic illustration of an alternative embodiment of the wastewater control system of FIG. 1 utilizing a different hydrologic sensing device.

A second embodiment of the invention illustrated in FIG. 2 uses a rainfall sensor 48 as a hydrologic sensing device in place of the flow level sensor 30 of FIG. 1. The rainfall sensor 48 may be any sensor indicating rainfall intensity or rainfall depth or accumulation. Studies have been done that correlate an amount of rain to CSO and SSO events. Signals representing an amount of rainfall detected by the sensor 48 are provided to the actuator 40 via the transmitter 36 and receiver 38. Upon detecting an amount of rainfall that would provoke a CSO or an SSO, the actuator 40 operates to close the flow control device 26. The period of time that the actuator 40 maintains the flow control device 26 closed is programmed into the actuator 40, and that period of time can be adjusted as the amount of rainfall detected by the rainfall sensor 48 increases. Further, actuator 40 can be set to allow for a lag time corresponding to rising and falling flow in the main sewer 34 so as to avoid a CSO and/or an SSO.

Figure 3:
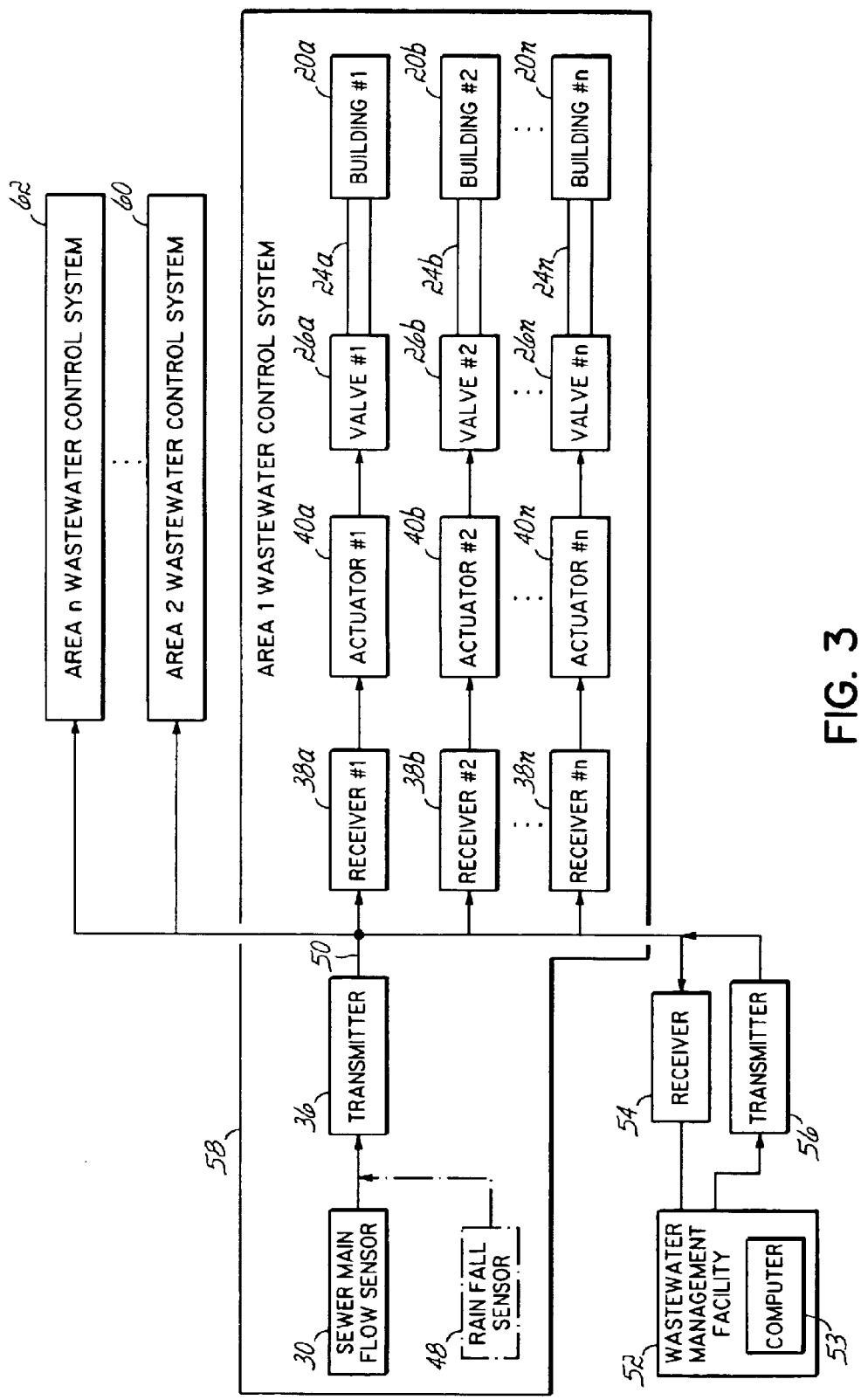
FIG. 3 is a schematic illustration of further embodiments of the wastewater control system of FIG. 1.

The wastewater control system described with respect to a single building of FIG. 1 can also be applied to a plurality of buildings. Referring to FIG. 3, a transmitter 36 is electrically connected to either a sewer main flow sensor 30 or a rainfall sensor 48 and is also in electrical communications over a wired or wireless communications link 50 with a plurality of receivers 38a–38n. Thus the high flow level signal is provided to a plurality of actuators 40a–40n that are connected to and operate a respective plurality of flow control devices 26a–26n, which are connected in a respective plurality of sewer service lines 24a–24n conducting wastewater from a respective plurality of buildings 20a–20n. Thus, wastewater from a number of buildings 20a–20n that are in a common neighborhood or geographic area can be temporarily detained or stored in respective sewer service lines 24a–24n during an event, for example, a thunderstorm, that would normally lead to a CSO or an SSO.

In a further embodiment, control of the wastewater retention can be centralized. A wastewater management facility 52 has a receiver 54 connected to the communications link 50, which receives the signals from the transmitter 36. In this embodiment, the receivers 38a–38n are not receptive to signals from the transmitter 36. Further, there are a number of other wastewater control systems 60, 62 that are similar to the wastewater control system 58. The wastewater management facility 52 receives signals from a plurality of hydrologic sensing devices 30, 48 that are located in the various wastewater control systems 58, 60, 62. By monitoring signals from the various hydrologic sensing devices 30, 48, personnel in the wastewater management facility 52 provide further signals via a transmitter 56 to the receivers 38a–38n for operating the flow control devices 26a–26n in the various wastewater control systems 58–62. Alternatively, a computer system 53 within the wastewater management facility 52 can provide signals controlling the operation of the flow control devices 26a–26n in the wastewater control systems 58–62 in response to signals from the hydrologic sensing devices 38, 48.

Figure 4:
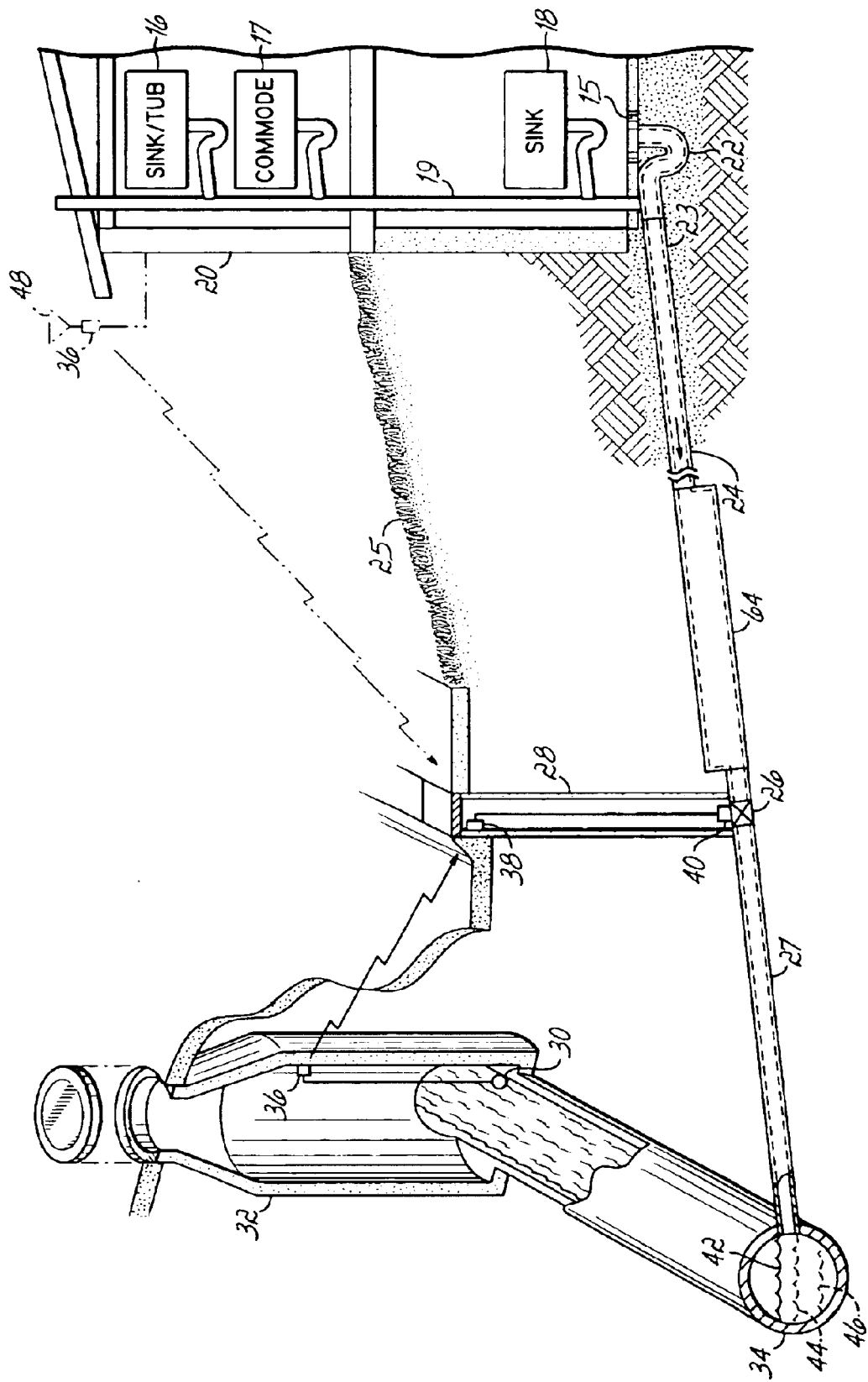
FIG. 4 is a schematic illustration of another embodiment of the wastewater control system of FIG. 1, which uses a detention tank near a downstream end of a sewer service line.

Referring to FIG. 4, in situations where the sewer service line 24 is relatively short or where more detention storage is needed, a detention tank 64 is installed in the sewer service line 24 to increase storage capacity. The detention tank 64 can be formed by using a tank component or enlarging a section of the sewer service line 24. Where more than one source is served, the detention tank 64 should be enlarged and designed as needed. This may be applied for example in the case where the building 20 is a multi-family facility. The operation of the wastewater control system of FIG. 4 is substantially similar to that previously described with respect to FIGS. 1–3. Under normal conditions, wastewater flows freely through the sewer service line 24 and the detention tank 64, past the flow control device 26 and into the sewer main 34. Under high flow conditions detected by the hydrologic device, the flow control device 26 is closed; and wastewater is detained in the detention tank 64. Upon detecting lower flow conditions, the flow control device 26 is opened and normal wastewater flow is resumed. As before, the hydrologic sensing device may be implemented using a flow sensor 30 or a rainfall sensor 48.

Figure 5:
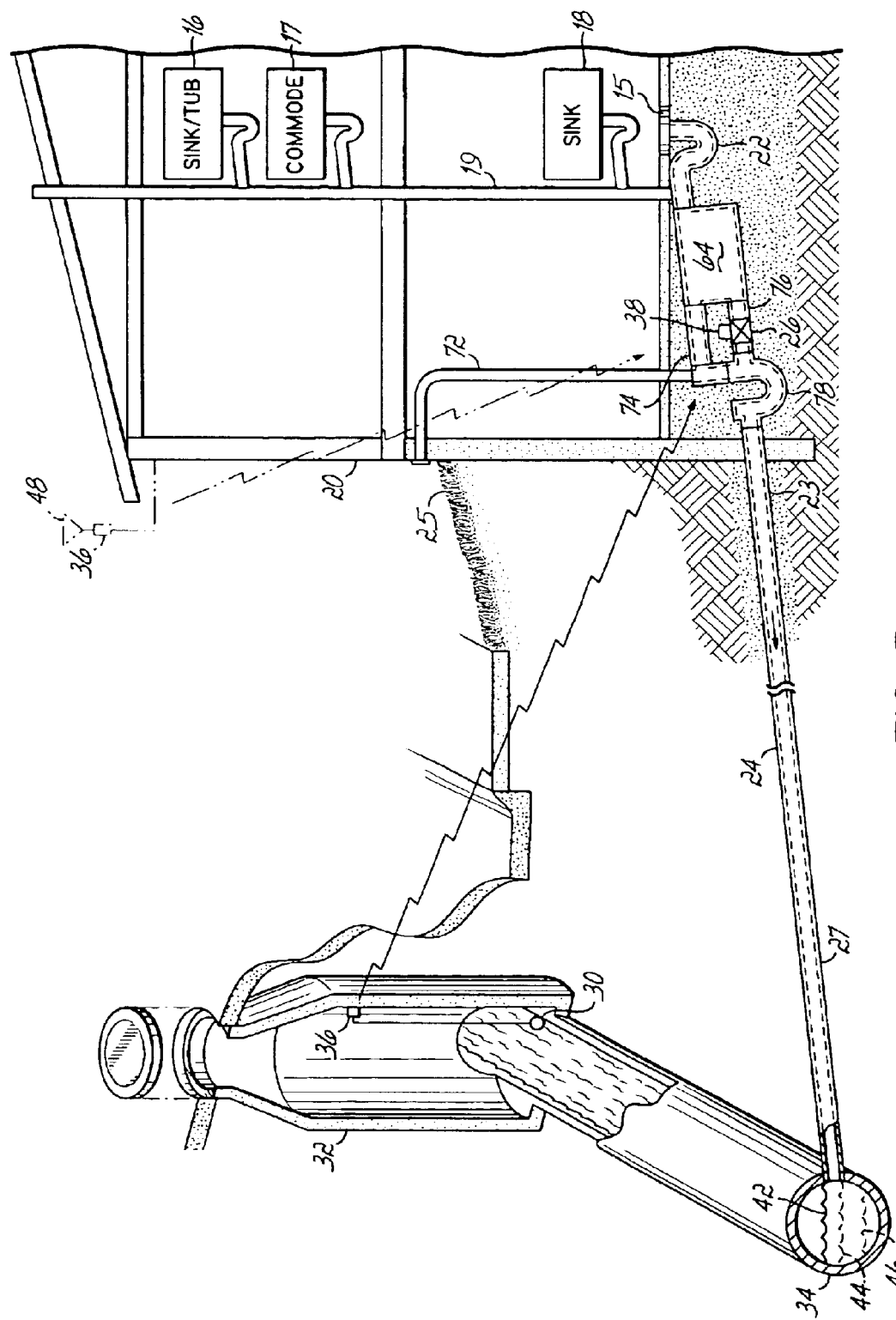
FIG. 5 is a schematic illustration of an alternative embodiment of the wastewater control system of FIG. 4, which uses a detention tank in a building near an upstream end of a sewer service line.

Referring to FIG. 5, the detention tank 64 may be provided in a basement or lower level containment box in the building 20 if the sewer service line 24 is short or for other reasons. During normal flow 46 in the sewer main 34, the building wastewater discharges from its plumbing fixtures and flows through the building drain piping 22, into the detention tank 64, through the tank outlet 76, through a cleanout 78 and out the sewer service line 24 to the sewer main 34. As previously described, in operation, the receiver 38 detects a high flow signal from the transmitter 36 representing a higher flow 42 in the sewer main 34 detected by the flow sensor 30. That high flow signal causes the flow control device 26 to close and detain wastewater in the detention tank 64. Typically a round cross-sectional shape of light weight non-corrosive materials will be most efficient for passage of flows. The detention tank 64 is provided with an air vent pipe connection 72 and an overflow outlet 74 to bypass flow to the sewer service line 24 when the tank becomes full. A tank outlet pipe 76 is connected to a running trap and clean-out fitting 78 and then to the sewer service line 24 that connects to the sewer main 34. In an alternative embodiment, the detention tank 64 may also be located outside the building 20 in an appropriate structure and may have a connection to one or more wastewater sources.

Figure 6:
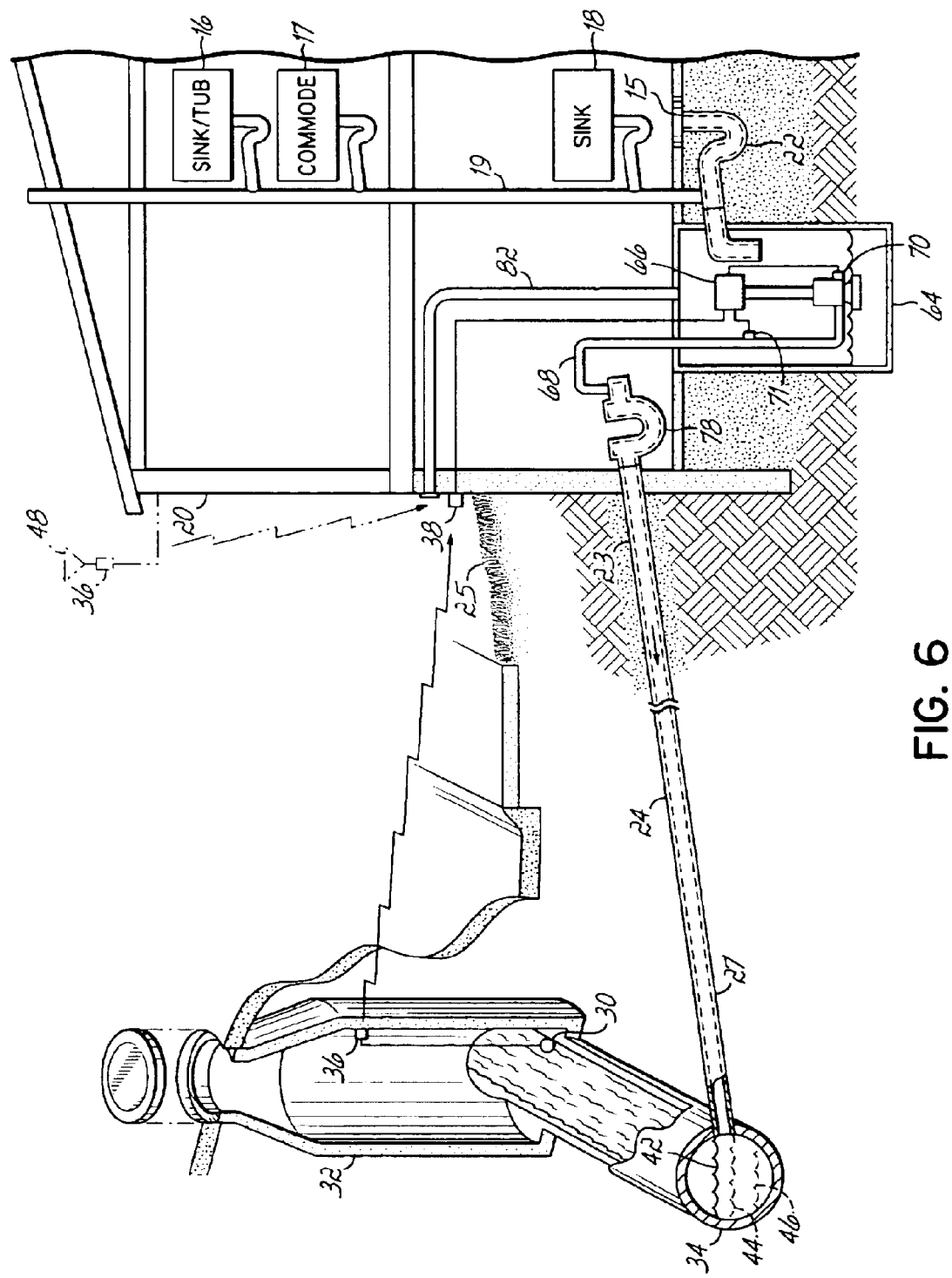
FIG. 6 is a schematic illustration of another embodiment of the wastewater control system of FIG. 4, which uses a detention tank and a sump pump inside a building.

Referring to FIG. 6, in those applications where gravity flow is inadequate, that is, the building drain pipe 22 is lower than the upstream end of the sewer service line 24, a sump pump 66 can be used. In this embodiment, the detention tank 64 and sump pump 66 are installed in an interior, lower portion, of the building 20. In operation, the combination of the detention tank 64 and sump pump 66 function as a flow control device to regulate the flow of wastewater from the building 20 during normal and excessive flow conditions in the sewer main 34. Under normal flow conditions in the sewer main 34, wastewater flows into the detention tank 64. A first liquid level sensor 70, for example, a float connected to a movable contact of a limit switch, detects a first, lower level of liquid in the detention tank 64 and provides a signal to the sump pump 66. The sump pump 66 operates in a known manner to pump wastewater out of the detention tank 64, up through a discharge pipe 68, through a cleanout 78 and into the sewer service line 24. Therefore, during normal sewer main flow conditions, there is a substantial wastewater reserve capacity in the detention tank 64. An air ventilation pipe 82 is provided from the detention tank 64 for ventilation of any gases.

If an event occurs that leads to a high flow in the sewer main 34, the receiver 38 detects a high flow signal from the transmitter 36 representing a higher flow 42 detected by a hydrologic sensing device, for example, the flow sensor 30 or rainfall sensor 48. That high flow signal from the receiver 38 via a relay or other means interrupts the connection of output signal from sensor 70 to the sump pump 66. Therefore, the sensor 70 does not operate the sump pump 66, and wastewater is able to accumulate in the detention tank 64 to levels above the sensor 70. Building wastewater is detained in the tank 64 until the flow in the sewer main 34 again subsides to a lower level 44. A low flow signal is then provided by the flow level sensor 30, which is transmitted to the receiver 38 via the transmitter 36. The receiver 38 provides the low flow signal to the sump pump 66, thereby causing the output signal from the sensor 70 to be reconnected to the sump pump 66. The sump pump 66 then operates to pump wastewater from the detention tank 64 until it is below a level detectable by the sensor 70, and thereafter, the sump pump 66 operates under low flow conditions as first described. A liquid level sensor 71 may be used to detect when the detention tank 64 is full and provide an output signal to operate the sump pump 66, thereby providing overflow relief.

In the embodiments of FIGS. 4–6, the detention tank 64 and sump pump 66, if used, are sized according to hydrologic conditions needed to detain the discharge of building wastewater during higher than normal storm water flows 42 in the sewer main 34. The volume of the detention tank 64 is based on the storage of building wastewater discharges needed to bridge typical wet weather flow periods in the sewer main 34. This requires a hydrologic analysis based on statistical rainfall data periods of the region in combination with typical wastewater discharge from domestic dwellings or building sources. For example, a 10 feet (3.05 meters) length of 12 inch (30.5 centimeters) diameter sewage service line has a detention volume of approximately 58 gallons (220 liters). Depending on the hydrologic region, this volume is in a range sufficient to detain single family domestic sewage during most typical periods of a CSO. The detention tank 64 may be of any shape, dimensions, or volume which provide for efficient fluid flow and the intended service, however a round pipe or tank of lightweight flexible material, such as a high strength plastic, may be cost effective. Further, as will be appreciated, the embodiments of FIGS. 4–6 may also be implemented in larger system schemes as illustrated and described with respect to FIG. 3.

All of the embodiments of the wastewater control systems 58–62 of FIGS. 1–6 will work with any sewer main of any size constructed on hydraulically mild open channel flow bottom slopes, that is, sub-critical or tranquil flow, or on hydraulically steep open channel flow bottom slopes, that is, super-critical or rapid flow. However, the wastewater control systems are expected to be more sensitive for mild slope applications with prevailing sub-critical or tranquil flow. Further, the wastewater control systems of FIGS. 1–6 will work for typical domestic wastewater discharges, however, for certain non-domestic building discharges, such as commercial or industrial wastes containing high concentrations of solids, a maceration device or a grinder pump is recommended for maintaining fluid flow. It should be noted that in all of the embodiments shown and described with respect to FIGS. 1–6, the flow control device 26 not only detains upstream wastewater from the building 20; but the flow control device 26 also prevents wastewater from backing up from the sewer main 34 into the building 20.

By using the various embodiments of the invention shown and described with respect to FIGS. 1–6, building wastewater is detained upstream from its point of discharge into sewer mains during heavy stormwater runoff periods. Thus, one advantage of the invention is that the creation of combined or mixed sewage is, in some applications, to some substantial degree avoided and, in other applications, prevented. Another advantage of the invention is the reduction of pollution content of combined sewage or wastewater mixtures that overflow from sewer systems into watercourses, streams, rivers, lakes, oceans, and other receiving bodies of water as a result of heavy rainfall runoff and infiltration. A further advantage of the invention is that it prevents wastewater from backing up from the sewer main 34 into the building 20.

While the present invention has been illustrated by a description of an embodiment, and while such embodiment has been described in considerable detail, there is no intention to restrict, or in any way limit, the scope of the appended claims to such detail. Additional advantages and modifications will readily appear to those skilled in the art. For example, the described embodiment relates to a combined sewer system in which wastewater from the building 20 and stormwater are combined in the sewer main 34. As will be appreciated, in a separate wastewater system in which there is one sewer main for wastewater and a second, separate sewer main for stormwater, overflows can still occur in the wastewater sewer main. In those applications, the various embodiments of the invention described with respect to FIGS. 1-6 can be applied to the separate wastewater system in the same manner as described herein in order to eliminate or substantially reduce the occurrence of overflows in the wastewater sewer main.

In the embodiments described herein, the flow control devices 26 are operated by respective actuators 40; however as will be appreciated, in alternative embodiments, the flow control devices 26 can be operated manually to provide the desired detention of wastewater prior to it entering a sewer main. Such manual operation can be initiated by one or more signals generated by a flow sensor or a rainfall sensor or, in response to instructions provided from a central wastewater management facility by broadcast or otherwise.

In the embodiment of FIG. 6, the detention tank 64 and sump pump 66 are located inside the building 20; however, as will be appreciated, in an alternative embodiment, the detention tank 64 and sump pump 66 can be installed in a service box 28 located outside the building 20.

Therefore, the invention in its broadest aspects is not limited to the specific details shown and described. Consequently, departures may be made from the details described herein without departing from the spirit and scope of the claims which follow.

What is claimed is:

1. A method of reducing entry of sanitary waste from a building drain wastewater source into a sewer main in response to a high flow in the sewer main, the method comprising:

providing a sewer service line having an upstream end connected to the building drain and a downstream end connected to the sewer main, the sewer service line conducting wastewater from the building drain to the sewer main;

detecting a first flow in the sewer main resulting from a high flow in the sewer main;

blocking the sewer service line in response to detecting the first flow;

accumulating the wastewater in the sewer service line to prevent its flow into the sewer main, thereby reducing entry of sanitary waste from the building drain into the sewer main;

detecting a second flow in the sewer main after the high flow; and unblocking the sewer service line in response to detecting the second flow to release wastewater accumulated in the sewer service line into the sewer main.

2. A method of claim 1 further comprising:

producing a first signal in response to a flow sensor detecting the first flow; and transmitting the first signal to a flow control device disposed in the sewer service line;

causing the flow control device to change state in response to the first signal to block the wastewater in the sewer service line from flowing into the sewer main.

3. A method of claim 2 further comprising:

producing a second signal in response to the flow sensor detecting the second flow; and transmitting the second signal to the flow control device; and causing the flow control device to change state in response to the second signal to unblock the sewer service line and release the wastewater accumulated in the sewer service line into the sewer main.

4. The method of claim 1 further comprising, after blocking the sewer service line, accumulating the wastewater in a detention tank in fluid communication with the sewer service line.

5. A method of claim 4 further comprising releasing the wastewater accumulated in the detention tank and into the sewer main in response to detecting the second flow.

6. A method of claim 5 further comprising pumping the wastewater from the detention tank and into the sewer main in response to detecting the second flow.

7. A method of claim 6 further comprising:

producing a first signal in response to a first sensor detecting the first flow; and transmitting the first signal to a flow control device disposed in the sewer service line;

causing the flow control device to change state in response to the first signal to accumulate wastewater in the detention tank.

8. A method of claim 7 further comprising:

producing a second signal in response to a second flow sensor detecting the second flow; and transmitting the second signal to the flow control device; and causing the flow control device to change state in response to the second signal to release the wastewater accumulated in the detention tank.

9. A method of claim 8 further comprising:

transmitting the second signal to a sump pump disposed in the detention tank to operate and operating the sump pump to pump wastewater from the detention tank into the sewer service line.

10. A method of reducing entry of sanitary waste from a building drain into a sewer main in response to a high flow in the sewer main, the method comprising:
- providing a sewer service line having an upstream end connected to the building drain and a downstream end connected to the sewer main, the sewer service line conducting wastewater from the building drain to the sewer main;
- detecting a rainfall with a potential of resulting in a high flow in the sewer main;
- blocking the sewer service line in response to detecting the rainfall;
- accumulating the wastewater in the sewer service line to prevent its flow into the sewer main, thereby reducing entry of sanitary waste from the building drain into the sewer main; and
- thereafter, unblocking the sewer service line to release wastewater accumulated in the sewer service line into the sewer main.

11. A method of claim 10 further comprising:
- producing a first signal in response to a rainfall sensor detecting the rainfall; and
- transmitting the first signal to a flow control device disposed in the sewer service line;
- causing the flow control device to change state in response to the first signal to block the wastewater in the sewer service line from flowing into the sewer main.

12. A method of claim 11 further comprising:
- producing a second signal; and
- transmitting the second signal to the flow control device; and
- causing the flow control device to change state in response to the second signal to unblock the sewer service line and release wastewater accumulated in the sewer service line into the sewer main.

13. A wastewater source control system for reducing entry of sanitary waste from a building drain into a sewer main in response to a high flow in the sewer main, the wastewater control system comprising:
- a sewer service line having an upstream end connected to the building drain and a downstream end connected to the sewer main, the sewer service line conducting a flow of wastewater from the building drain to the sewer main;
- a hydrologic sensor producing
  - a first signal in response to detecting a high flow in the sewer main, and
  - a second signal in response to detecting a lesser flow in the sewer main after the high flow;
- a flow control device connected in the sewer service line; and
- an actuator in electrical communication with the sensor and connected to the flow control device, the actuator operating the flow control device to
  - block the sewer service line in response to the first signal and collect wastewater in the sewer service line, thereby reducing entry of sanitary waste from the building drain into the sewer main, and
  - unblock the sewer service line in response to the second signal and allow wastewater collected in the sewer service line to then flow into the sewer main.

14. The wastewater source control system of claim 13 wherein the hydrologic sensor comprises a flow sensor providing the output signal in response to the flow sensor measuring a greater than normal flow in the sewer main.

15. The wastewater source control system of claim 14 wherein the sewer main extends through a manhole and the flow sensor is located in the sewer main near the manhole.

16. The wastewater source control system of claim 15 further comprising a transmitter disposed in the manhole and electrically connected to the hydrologic sensor.

17. The wastewater source control system of claim 15 further comprising a service box near a downstream end of the sewer service line, and the flow control device is disposed in the service box.

18. The wastewater source control system of claim 17 further comprising a receiver disposed in the service box, the receiver being electrically connected to the actuator and in electrical communications with the transmitter.

19. The wastewater source control system of claim 13 wherein the hydrologic sensor comprises a flow level sensor providing the output signal in response to the flow level sensor detecting a higher than normal level of flow in the sewer main.

20. The wastewater source control system of claim 13 wherein the hydrologic sensor comprises a rainfall sensor providing the output signal in response to the rainfall sensor detecting an amount of rain likely to lead to a greater than normal flow in the sewer main.

21. The wastewater source control system of claim 13 further comprising:
- a transmitter electrically connected to the hydrologic sensor; and
- a receiver electrically connected to the actuator and in electrical communications with the transmitter.

22. The wastewater source control system of claim 13 further comprising a service box having an upper end accessible from a grade surface and a lower end below grade adjacent to the sewer service line, the service box providing access to the flow control device and the actuator.

23. A wastewater source control system for reducing entry of sanitary waste from a building drain into a sewer main in response to a high flow in the sewer main, the wastewater control system comprising:
- a sewer service line having an upstream end connected to the building drain and a downstream end connected to the sewer main, the sewer service line conducting a flow of wastewater from the building drain to the sewer main;
- a detention tank in fluid communication with the sewer service line;
- a hydrologic sensor producing
  - a first signal in response to detecting a high flow in the sewer main, and
  - a second signal in response to detecting a lesser flow in the sewer main after the high flow;
- a flow control device connected in the sewer service line; and
- an actuator in electrical communication with the sensor and connected to the flow control device, the actuator operating the flow control device to
  - block the sewer service line in response to the first signal and collect wastewater in the sewer service line, thereby reducing entry of sanitary waste from the building drain into the sewer main, and
  - unblock the sewer service line in response to the second signal and allow wastewater collected in the detention tank to then flow into the sewer main.

24. The wastewater source control system of claim 23 wherein the detention tank and flow control device are disposed closer to the downstream end of the sewer service line than the upstream end.

25. The wastewater source control system of claim 23 wherein the detention tank and flow control device are disposed near an upstream end of the sewer service line.

26. The wastewater source control system of claim 23 wherein the detention tank and flow control device are disposed near an upstream end of the sewer service line and inside a building.

27. The wastewater source control system of claim 23 further comprising a sump pump disposed in the detention tank.

28. The wastewater source control system of claim 27 wherein the detention tank, the sump pump and flow control device are disposed closer to a downstream end of the sewer service line than an upstream end.

29. The wastewater source control system of claim 27 wherein the detention tank, the sump pump and flow control device are disposed near an upstream end of the sewer service line.

30. The wastewater source control system of claim 27 wherein the detention tank, the sump pump and flow control device are disposed near an upstream end of the sewer service line and inside the building.

31. A wastewater source control system for reducing entry of sanitary waste from a building drains into a sewer main in response to a high flow in the sewer main, the wastewater control system comprising:
 a first plurality of sewer service lines, each of the first plurality of sewer service lines having an upstream end connected to a respective building drain and a downstream end connected to the sewer main, each of the first plurality of sewer service lines conducting a flow of wastewater from the respective building drain to the sewer main;
 a first hydrologic sensor producing
  a first signal in response to detecting a high flow in the sewer main, and
  a second signal in response to detecting a lesser flow in the sewer main after the high flow;
 a first plurality of flow control devices, each of the first plurality of flow control devices connected in a different one of the first plurality of sewer service lines; and
 a first plurality of actuators, each of the first plurality of actuators being in electrical communication with the first hydrologic sensor and connected to a different one of the first plurality of flow control devices, each of the first plurality of actuators operating a respective flow control device to
  block a respective sewer service line in response to the first signal and collect wastewater in the respective sewer service line, thereby reducing entry of sanitary waste from the building drain into the sewer main, and
  unblock the respective sewer service line in response to the second signal and allow collected wastewater to then flow into the sewer main.

32. The wastewater source control system of claim 31 further comprising a central wastewater management facility in electrical communication with the first hydrologic sensor and the first plurality of actuators, the central management facility operating the first plurality of actuators in response receiving the first signal and the second signal.

33. The wastewater source control system of claim 32 further comprising:
 a second plurality of sewer service lines, each of the second plurality of sewer service lines having an upstream end connected to a respective building drain and a downstream end connected to the sewer main, each of the second plurality of sewer service lines conducting a flow of wastewater from the respective building drain to the sewer main;
 a second hydrologic sensor in electrical communication with the central wastewater management facility and producing
  a third signal in response to detecting a high flow in the sewer main, and
  a fourth signal in response to detecting a lesser flow in the sewer main after the high flow;
 a second plurality of flow control devices, each of the second plurality of flow control devices connected in a different one of the second plurality of sewer service lines; and
 a second plurality of actuators in electrical communication with the central wastewater management facility, each of the second plurality of actuators being connected to a different one of the second plurality of flow control devices, the central wastewater management facility operating one of the second plurality of flow control devices to
  block a respective sewer service line in response to the third signal and collect wastewater in the respective sewer service line, thereby reducing entry of sanitary waste from a building drain into the sewer main, and
  unblock the respective sewer service line in response to the fourth signal and allow collected wastewater to then flow into the sewer main.

* * * * *